(12) United States Patent
Bordignon et al.

(10) Patent No.: US 8,960,388 B2
(45) Date of Patent: Feb. 24, 2015

(54) SPRING WITH FLUID

(76) Inventors: Alberto Bordignon, Rosa' (IT); Simone Bordignon, Rossano Veneto (IT)

( * ) Notice: Subject to any disclaimer, the term of this patent is extended or adjusted under 35 U.S.C. 154(b) by 35 days.

(21) Appl. No.: 13/563,829

(22) Filed: Aug. 1, 2012

(65) Prior Publication Data

US 2013/0048453 A1 Feb. 28, 2013

(30) Foreign Application Priority Data

Aug. 22, 2011 (IT) ................................ VR2011A0171

(51) Int. Cl.
*F16F 9/36* (2006.01)

(52) U.S. Cl.
CPC ........................................ *F16F 9/36* (2013.01)
USPC ....... 188/322.17; 188/316; 277/584; 277/438; 92/165 R; 92/168

(58) Field of Classification Search
USPC ..................... 188/316, 322.17; 267/119, 130; 277/510, 534, 436–438, 584, 630, 637, 277/644; 92/165 R, 168
See application file for complete search history.

(56) References Cited

U.S. PATENT DOCUMENTS

| | | | |
|---|---|---|---|
| 4,284,280 A * | 8/1981 | Bertram et al. ................ | 277/558 |
| 4,342,448 A * | 8/1982 | Wallis ........................... | 267/119 |
| 4,553,761 A * | 11/1985 | Blesing et al. ................ | 277/553 |
| 4,693,343 A | 9/1987 | Boyd | |
| 4,765,227 A | 8/1988 | Balazs et al. | |
| 5,007,276 A * | 4/1991 | Kadis et al. ...................... | 72/351 |
| 5,088,745 A * | 2/1992 | Peppiatt et al. ............... | 277/579 |
| 5,265,852 A * | 11/1993 | Taylor ........................... | 267/119 |
| 5,339,932 A * | 8/1994 | Lanterman .................... | 188/316 |
| 5,344,125 A * | 9/1994 | Cotter ......................... | 267/64.28 |
| 5,437,436 A | 8/1995 | Holson et al. | |
| 6,113,108 A * | 9/2000 | Friend et al. .................. | 277/549 |
| 6,290,235 B1 * | 9/2001 | Albertson ..................... | 277/510 |
| 6,595,524 B1 * | 7/2003 | Zitting .......................... | 277/436 |
| 8,056,903 B2 * | 11/2011 | Matsui et al. ................. | 277/534 |
| 8,474,829 B2 * | 7/2013 | Otsuka et al. ................. | 277/584 |
| 2003/0052458 A1 | 3/2003 | Zafar | |
| 2006/0278391 A1 * | 12/2006 | Li et al. ........................ | 166/288 |

FOREIGN PATENT DOCUMENTS

EP 0362815 A2 4/1990

* cited by examiner

*Primary Examiner* — Thomas J Williams
*Assistant Examiner* — Mariano Sy
(74) *Attorney, Agent, or Firm* — Pearne & Gordon LLP

(57) ABSTRACT

A spring (1) with fluid (2) including a containment body (3) having an inner chamber (4) in which the fluid (2) is inserted, a compression unit (8) slidably mounted on the containment body (3) and a sealing gasket (11) for the fluid (2) interposed between the containment body (3) and the compression unit (8) for preventing escape of the fluid (2) from the inner chamber (4); the spring (1) includes at least one closed loop (13) surrounding the compression unit (8), connected to the containment body (3) and in contact with the sealing gasket (11) so as to limit the deformation of the latter.

16 Claims, 6 Drawing Sheets

SPRING WITH FLUID

This invention relates to a spring with fluid.

More specifically, the fluid used for this invention is an inert gas. Preferably, this invention applies to the field of machines for moulding plastic and sheet metal for providing a predetermined resistance to the press performing the moulding.

According to the prior art, a gas spring usually comprises a containment body having an inner chamber in which the gas is inserted. In addition, the gas spring comprises a rod slidably inserted in the inner chamber and acting on the gas.

Externally, the gas spring acts as a conventional helical spring developing a force opposite to that with which it is stressed. However, in the case of the gas spring, the force is linked to the compression and extension of the gas contained in the inner chamber. In practice, by lowering the rod the gas is compressed (spring loaded), whilst by releasing the rod the latter extends and the gas returns to the initial condition.

Moreover, a gas spring usually comprises a sealing gasket interposed between the containment body and the rod for preventing escape of the gas from the chamber causing the unloading of the spring.

The sealing gasket is usually a loop positioned around the rod. Moreover, the sealing gasket is at least partly connected to the containment body so as to remain stationary in position during the sliding of the rod.

However, this prior art technique has several disadvantages.

The sliding of the rod on the sealing gasket and the consequent heat generated cause, over time, a deformation (commonly called "extrusion") of the sealing gasket with consequent loss of gas. Consequently, the deformation of the sealing gasket causes the unloading of the spring thus rendering it ineffective.

In order to re-use the spring it is therefore necessary to replace the deformed sealing gasket with a new one and introduce new gas into the chamber. Obviously, this operation causes a considerable waste of time and, consequently, a loss of money.

In this situation, the aim of this invention is to provide a spring with fluid which overcomes the disadvantages of the prior art.

More specifically, the aim of this invention is to provide a spring with fluid which has a longer useful life compared with the prior art.

Yet more specifically, the aim of this invention is to provide a spring with fluid which avoids the deformation of the sealing gasket.

The aims indicated are substantially achieved by a spring with fluid as described in the appended claims.

Further characteristic features and advantages of this invention will emerge more clearly from the detailed description of several preferred, but not exclusive embodiments of a spring with fluid illustrated in the accompanying drawings, in which.

Figure 1:
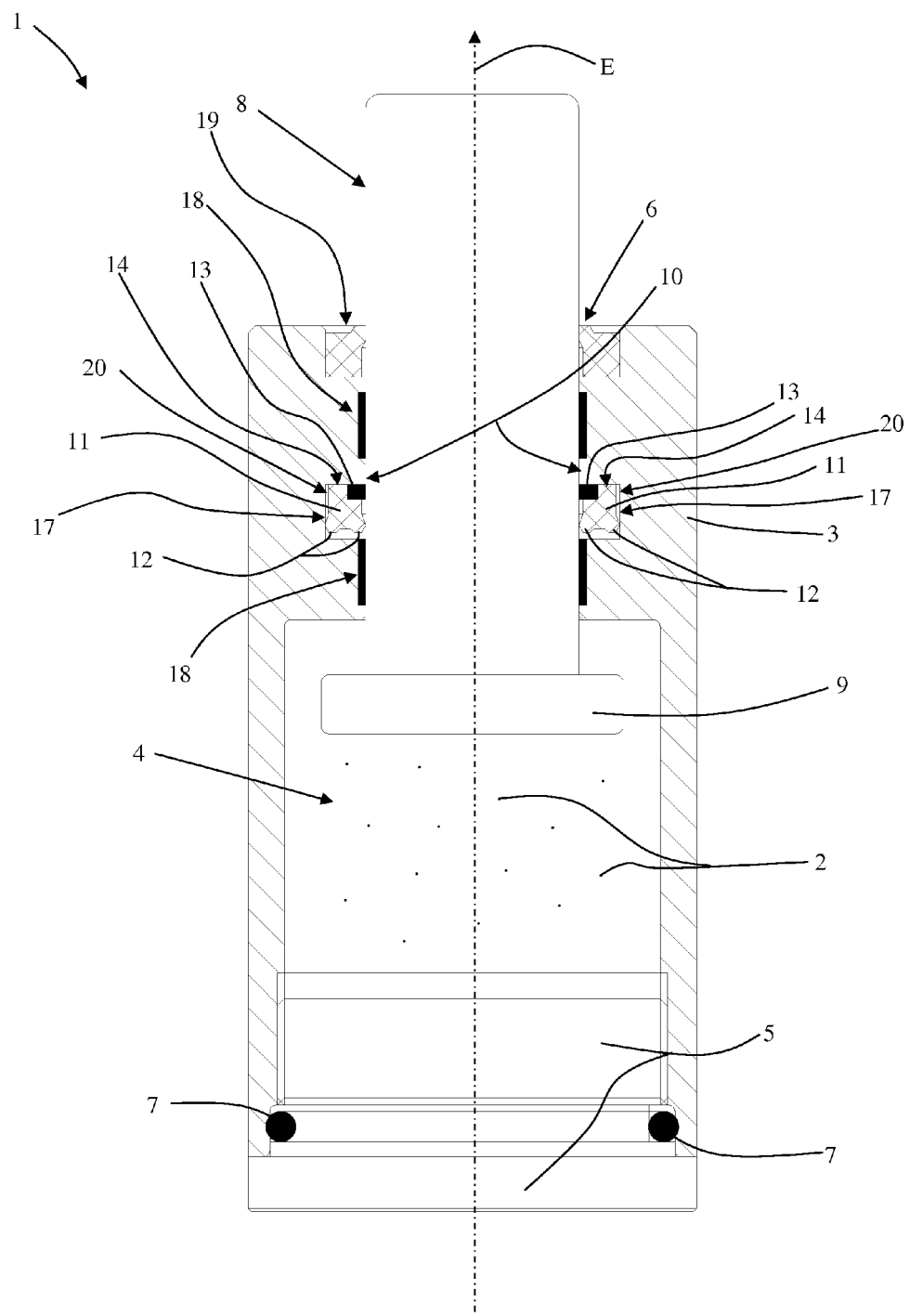
FIG. 1 shows a front view of a spring with fluid according to this invention, with some parts in cross section and in a first operating position.

With reference to the said figures, the numeral 1 denotes in its entirety a spring 1 with fluid 2 according to this invention.

More specifically, the spring 1 with fluid 2 comprises a containment body 3 having an inner chamber 4. The containment body 3 extends, along a respective axis of extension S, from its bottom portion 5 to an opening 6.

In the preferred embodiment illustrated by way of an example in FIG. 1, the bottom portion 5 comprises a cap screwed into the containment body 3 along part of the axis of extension S of the containment body 3. Moreover, the bottom portion 5 comprises a seal ring 7 interposed between the cap and the seal body 3 for sealing the inner chamber 4.

In an alternative embodiment, the bottom portion 5 forms a single body with the containment body 3 and it is only removable from the latter by mechanical cutting.

Moreover, the spring 1 with fluid 2 comprises a compression unit 8 slidably mounted on the containment body 3 and extending, at least partly, inside the inner chamber 4. More specifically, the compression unit 8 is movable between a relative extended position (FIG. 1) wherein it is mainly outside the chamber 4, and a compressed position (FIG. 2) opposite to the extended position. In addition, the compression unit 8 is slidable from the extension position to the compression position along a respective direction of loading C and, from the compression position (FIG. 2) to the extension position (FIG. 1), along a respective direction of extension E.

In other words, the compression unit 8 is slidable along the direction of extension E (slidable in extension) when it moves away, at least partly, from the chamber 4, and it is slidable along the direction of loading C when it enters, at least partly, inside the chamber 4 (slidable in compression).

Advantageously, the direction of loading C and the direction of extension E are parallel to each other. Preferably, the direction of loading C and the direction of extension E are parallel to the axis of extension S of the containment body 3.

As shown in the accompanying drawings, the compression unit 8 comprises a wide portion 9 inserted inside the containment chamber 4 for forming an end of stroke position of the compression unit 8 during the sliding along the extension. For this reason, the wide portion 9 has a width, measured transversely to the axis of extension S of the containment body 3, which is greater than the width of the opening 6 measured transversely to the axis of extension S of the containment body 3.

In other words, the wide portion 9 of the compression unit 8 has a width, measured transversely to the axis of extension S of the containment body 3, which is greater than the width of the remaining part of compression unit 8 present inside the chamber 4.

It should be noted that the wide portion 9 defines the position of extension of the compression unit 8. In effect, the compression unit 8 is in the extension position when the wide portion 9 is in contact with the containment body 3 at the opening 6.

Figure 3:
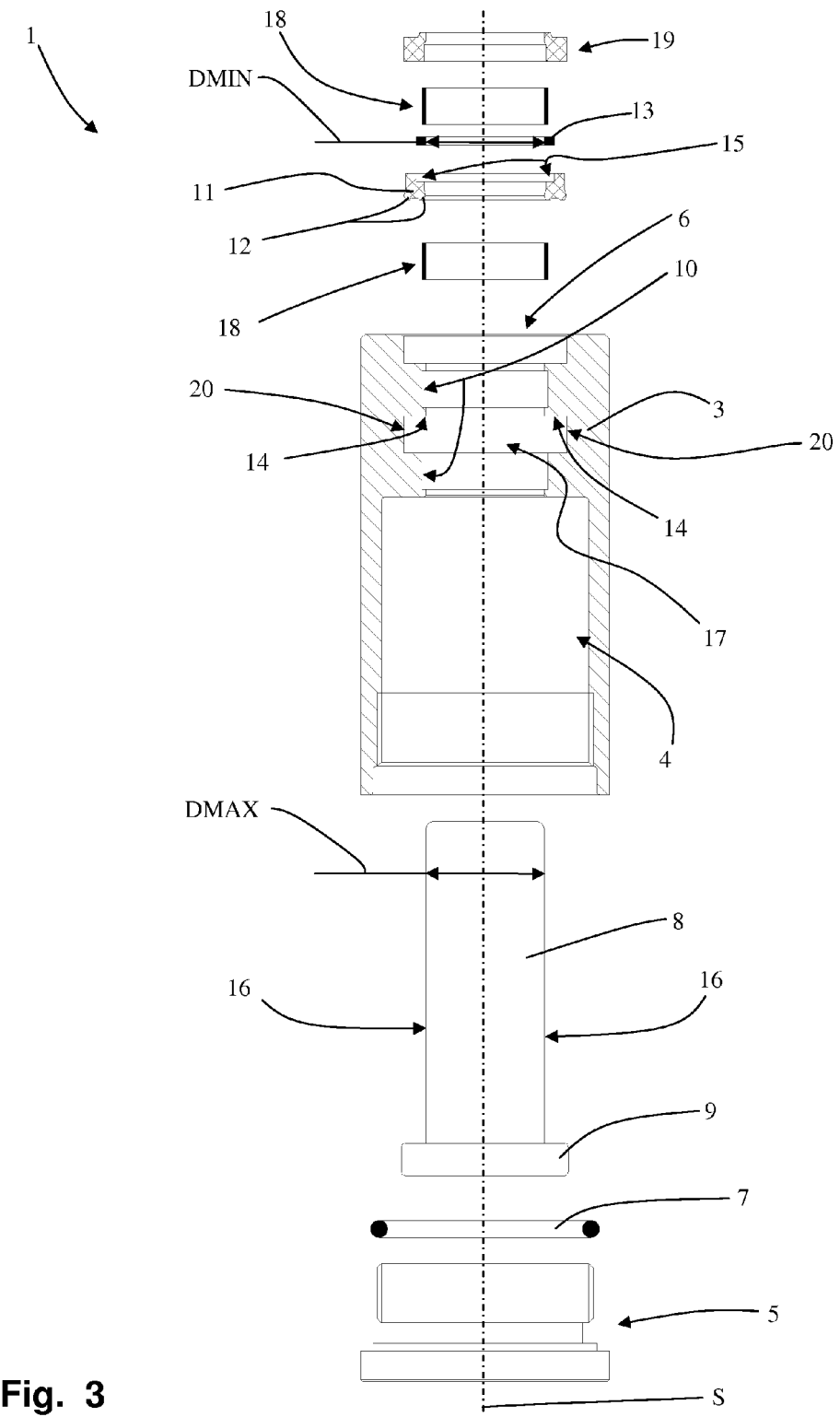
FIG. 3 shows an exploded front view of the spring with fluid illustrated in FIG. 1.

In the preferred embodiment illustrated by way of an example in FIG. 3, the opening 6 extends from the outside towards the inner chamber 4 along the axis of extension S of the containment body 3. In other words, the opening 6 has a depth measured along the axis of extension S of the containment body 3. More in detail, the containment body 3 has a relative sliding plane 10 having an annular extension around the opening 6. The compression unit 8 is inserted along the opening 6 and slides relative to it.

Moreover, the spring 1 with fluid 2 comprises a compressible fluid 2 inserted in the inner chamber 4.

More specifically, the fluid 2 inserted in the inner chamber 4 is pressed so as to make a predetermined resistance to the sliding in compression of the compression unit 8. For example, the fluid 2 inserted in the chamber 4 has a pressure of 200 bar.

Figure 2:
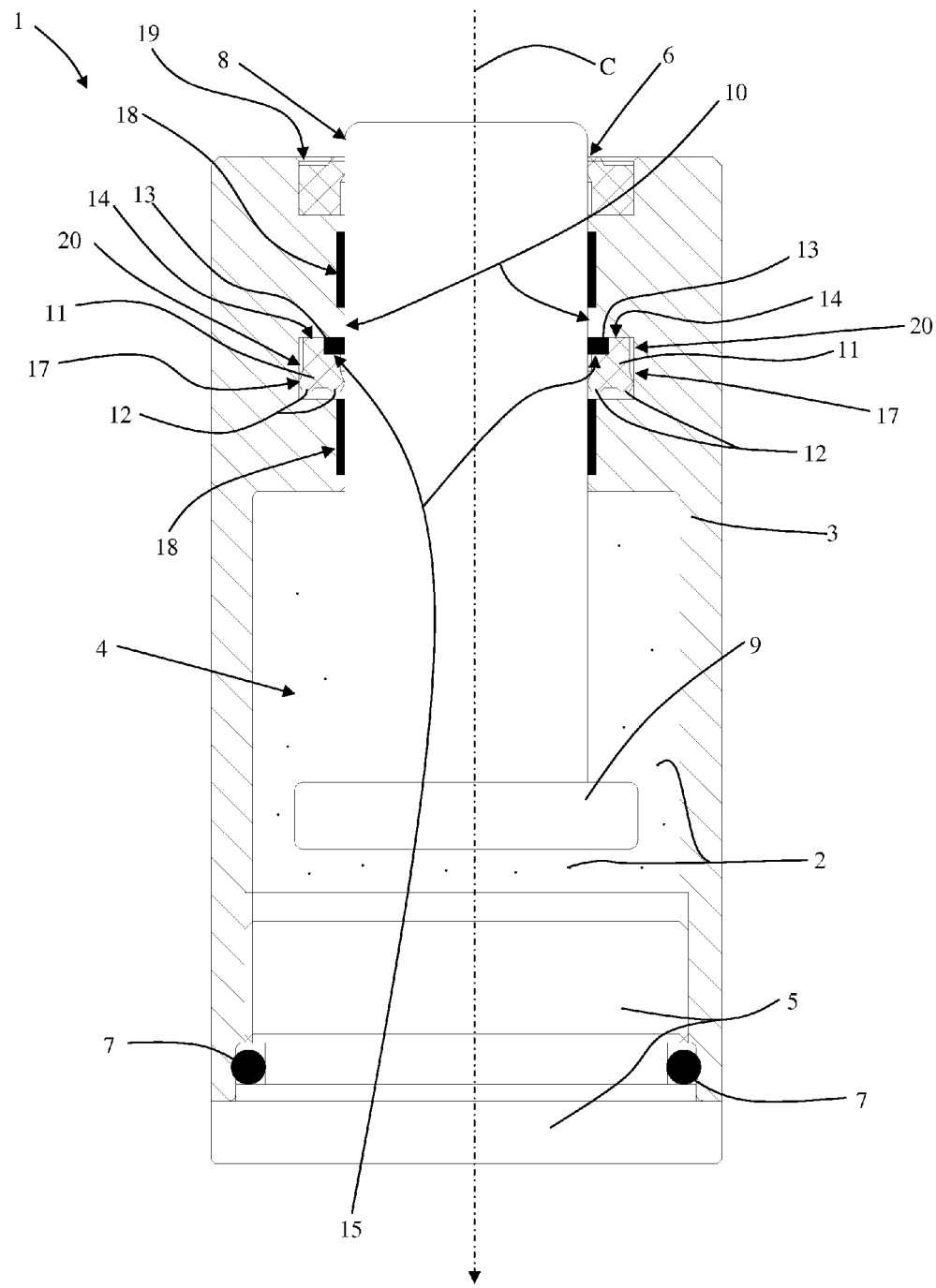
FIG. 2 shows a front view of the spring with fluid illustrated in FIG. 1 in a second operating position.

Preferably, the fluid 2 is an inert gas (shown as dots in FIGS. 1 and 2). Still more preferably, the gas comprises molecules of nitrogen. For this reason, the spring 1 with fluid 2, in the preferred embodiment shown in the accompanying figures, is called "gas spring 1".

In addition, the spring 1 with fluid 2 comprises a sealing gasket 11 interposed between the containment body 3 and the compression unit 8 for preventing escape of the fluid 2 from the inner chamber 4. In more detail, the sealing gasket 11 is positioned between the sliding plane 10 of the containment body 3 and the compression unit 8. In yet further detail, the sealing gasket 11 is positioned externally side by side with the sliding plane 10 and internally side by side with the compression unit 8. It should be noted that the terms externally and internally refer, respectively, to an external extension and an internal extension of the sealing gasket 11.

More in detail, the sealing gasket 11 has an annular extension and completely encircles the compression unit 8 at the opening 6.

Advantageously, the sealing gasket 11 is in contact with the compression unit 8 so as to form the seal of the inner chamber 4.

Figure 4:
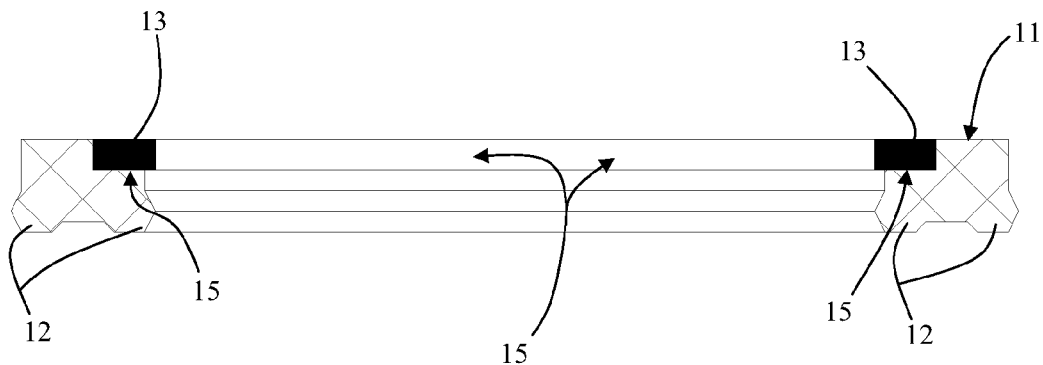
FIG. 4 shows a front view and cross-section of the spring with fluid illustrated in FIG. 3.
Figure 5:
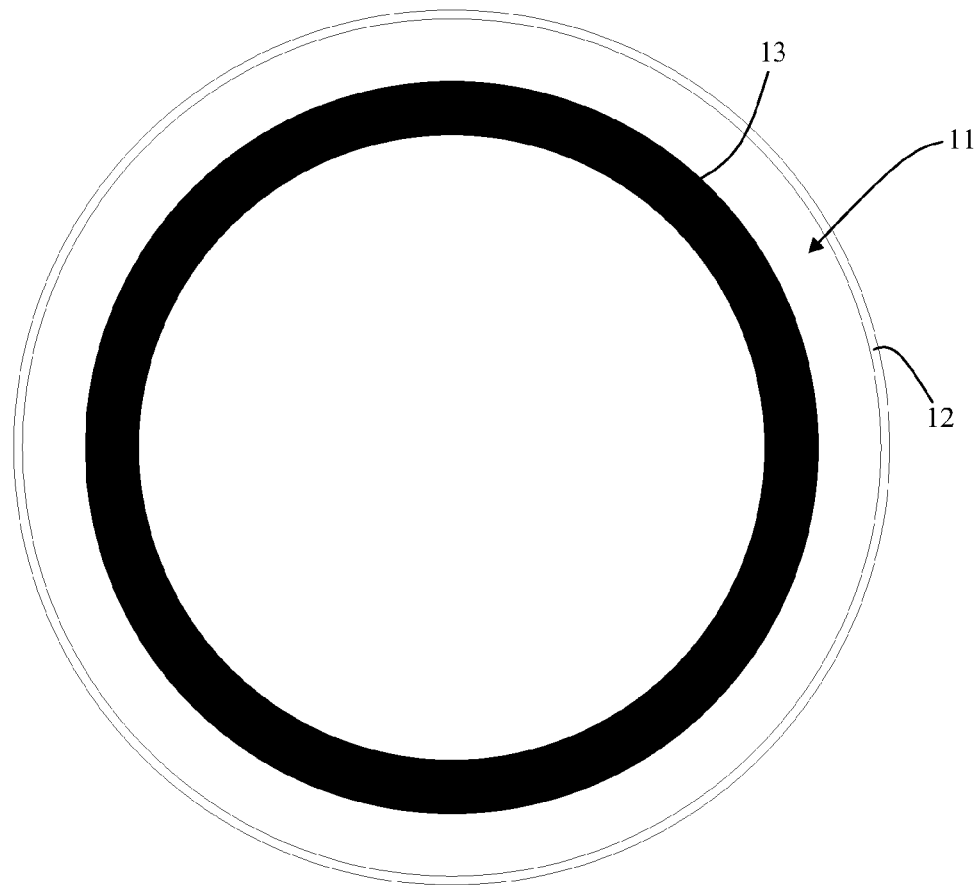
FIG. 5 shows a top view of a detail of the spring with fluid illustrated in FIG. 4.

In the preferred embodiment illustrated by way of an example in FIG. 4, the sealing gasket 11 has two protrusions 12 extending along the direction of loading C and away from each other. These protrusions 12 extend, advantageously, along the entire annular extension of the sealing gasket 11 for favouring contact of the latter with the compression unit 8. More specifically, the two protrusions 12 extend respectively along the internal annular extension of the sealing gasket 11 and along the external annular extension of the sealing gasket 11. Yet more specifically, the protrusion 12 of the sealing gasket 11 extending along the internal annular extension protrudes towards the compression unit 8 and is in contact with it.

Advantageously, the protrusions 12 give a certain flexibility to the sealing gasket 11 so as to better adhere to the compression unit 8.

Moreover, the sealing gasket 11 extends along a plane it which it lies substantially transversal to the axis of extension S of the containment body 3.

Figure 8:
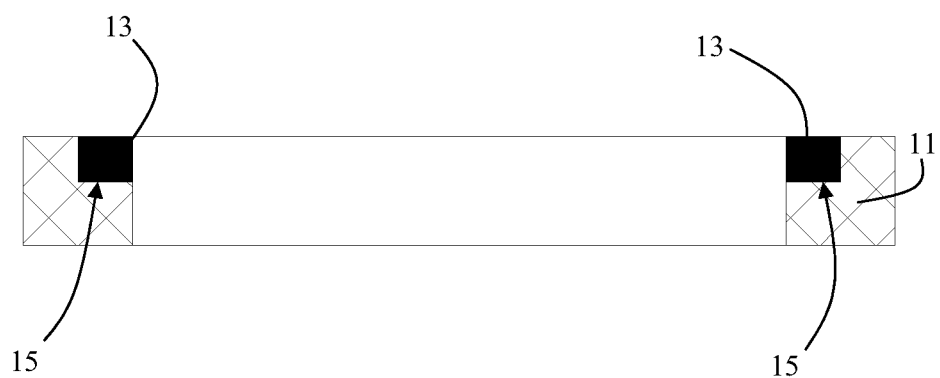
FIG. 8 shows a front view and cross-section of an alternative embodiment of the detail of the spring with fluid illustrated in FIG. 4.

In an alternative embodiment illustrated in FIG. 8, the sealing gasket 11, cross-sectioned transversely to the plane in which it lies, has a rectangular profile.

According to this invention, the spring 1 with fluid 2 comprises at least one closed loop 13 surrounding the compression unit 8 and connected to the containment body 3. More specifically, the closed loop 13 is positioned, at least during the sliding of the compression unit 8, in contact with the sealing gasket 11 so as to limit the deformation of the latter.

In other words, the closed loop 13 is in contact with the sealing gasket 11 so as to hold the deformation of the sealing gasket 11 during the sliding of the compression unit 8. In yet other words, the closed loop 13 is positioned alongside the sealing gasket 11.

More specifically, the closed loop 13 is, at least partly, interposed between the sealing gasket 11 and the containment body 3 according to the direction of extension E of the compression unit 8. Preferably, the closed loop 13 is only partly interposed between the sealing gasket 11 and the containment body 3 (FIG. 1) according to the direction of extension E of the compression unit 8.

In effect, as shown in FIG. 1, the closed loop 13 is interposed between the sealing gasket 11 and the containment body 3 (according to the direction of extension E of the compression unit 8) close to the compression unit 8 so as to prevent deformation of the sealing gasket 11 at the compression unit 8. Moreover, the sealing gasket 11 is in contact with the compression unit 3 in an area spaced from the compression unit 8.

In other words, the containment body 3 defines a contact surface 14 extending transversely to the direction of extension E and placed in contact both with the sealing gasket 11 and with the closed loop 13.

In practice, in the preferred embodiment, the closed loop 13 covers, transversely to the direction of extension E of the compression unit 8, only partly the sealing gasket 11.

In that case, the width of the closed loop 13 measured transversely to the direction of extension E of the compression unit 8 is less than the width of the sealing gasket 11 measured transversely to the direction of extension E.

It should be noted that the measurement of the width of the closed lop 13 and of the sealing gasket 11 is measured on a respective cross-section according to a cross-section plane transversal to the direction of extension E.

Figure 6:
FIG. 6 shows a front view and cross-section of a variant of the detail of the spring with fluid illustrated in FIG. 4.
Figure 7:
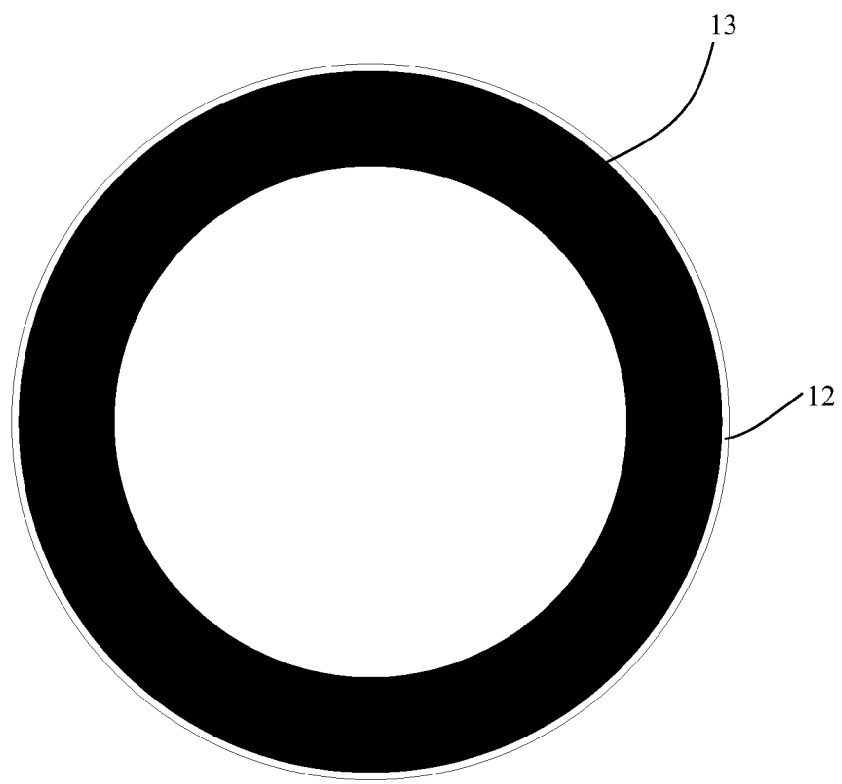
FIG. 7 shows a top view of the variant of the detail of the spring with fluid illustrated in FIG. 6.

In a variant illustrated in FIGS. 6, 7 and 9, the closed loop 13 is entirely interposed between the sealing gasket 11 and the containment body 3 according to the direction of extension E of the compression unit 8.

In practice, in the variant, the closed loop 13 covers, transversely to the direction of extension E of the compression unit 8, entirely the sealing gasket 11 (except for the protrusions 12).

More specifically, the sealing gasket 11 has a groove 15, extending along its annular extension, in which the closed loop 13 is inserted. Preferably, the groove 15 is shaped to match the closed loop 13 in such a way that the latter enters the space of the sealing gasket 11.

It should be noted that, preferably, the closed loop 13 and the sealing gasket 11 are circular in shape. Moreover, the compression unit 8 has a contact portion 16 shaped like a cylinder and in contact with the closed loop 13 and the sealing gasket 11.

This contact portion 16 has an outer surface which, during sliding, is in contact with the sealing gasket 11. For this reason, the outer surface of the contact portion 16 is substantially cylindrical and extends along the direction of extension E of the compression unit 8.

In the preferred embodiment illustrated in FIG. 3, the closed loop 13 and the sealing gasket 11 are coaxial.

In addition, the closed loop 13 is placed above the sealing gasket 11 along the direction of extension E of the spring 1.

According to this invention, the closed loop 13 is in contact with the compression unit 8 along an annular extension of the closed loop 13 such that the compression unit 8 operates in contact with the closed loop 13. In other words, the compression unit 8 operates in interference with the closed loop 13.

In the preferred embodiment, the closed loop 13 has a minimum diameter DMIN less than the maximum diameter DMAX of the contact portion 16 of the compression unit 8. For this reason, the closed loop 13 has an annular interference surface in close contact with the contact portion 16 of the compression unit 8.

Moreover, FIGS. 1, 2 and 3 show that the containment body 3 has a positioning seat 17 in which the sealing gasket 11 and the closed loop 13 are fixed.

More specifically, the positioning seat 17 is positioned along the opening 6 and has an annular extension. Yet more specifically, the positioning seat 17 is substantially shaped to match the sealing gasket 11 and the closed loop 13.

Preferably, the closed loop 13 is flexible and it is made from a material harder than the material with which the sealing gasket 11 is made.

In detail, the material from which the closed loop 13 is made is a thermoplastic polymer, called PEEK (polyetheretherketone). Advantageously, this material gives the closed loop 13 flexibility and hardness.

Moreover, the anti-deformation loop preferably has a height, measured along the direction of extension E of the compression unit 8, less than 0.7 millimeters. Advantageously, this height facilitates the assembly of the closed loop 13 inside the containment body 3.

Moreover, this height allows the closed loop 13 to follow precisely (almost exactly) the contact portion 16 of the compression unit 8 also in the case of movements of the latter non-parallel to the direction of extension E. In this way, the possible formation of gaps between the compression unit 8 and the closed loop 13 is avoided.

Moreover, the spring 1 with liquid 2 comprises guide means 18 interposed between the compression unit 8 and the containment body 3 for guiding the sliding of the compression unit 8. Preferably, the guide means 18 comprise two annular bodies positioned in suitable housings made along the opening 6 of the containment body 3. More specifically, the closed loop 13 and the sealing gasket 11 are interposed between the two annular bodies of the guide means 18 along the direction of extension E.

Lastly, the spring 1 comprises a rod scraper ring 19 positioned above the guide means 18 along the opening 6 of the containment body 3 for closing the latter.

This invention fulfils the preset aims.

More specifically, this invention provides a spring 1 with fluid 2 which has a longer useful life compared with the prior art.

In effect, the presence of the closed loop 13 in contact with the sealing gasket 11 creates an anti-deformation barrier for the sealing gasket 11.

Moreover, the closed loop 13 guarantees a greater protection of the sealing gasket 11 with aggressive liquids (used in machines for die forming sheet metal) which could enter into contact with the sealing gasket 11 and ruin it. In effect, as the closed loop 13 in the preferred embodiment is superposed on the sealing gasket 11 and operating in interference with the compression unit 8, the sealing gasket 11 is protected from the outside.

In addition, the closed loop 13, comprising only part of the sealing gasket 11, allows material to be saved in the step for making the loop. Lastly, the closed loop 13, comprising only part of the sealing gasket 11, allows an easier assembly of the closed loop 13 inside the spring 1.

It should also be noticed that this invention is relatively easy to produce and that even the cost linked to implementation of the invention is not very high.

The invention claimed is:

1. A spring (1) with fluid (2) comprising:
    a containment body (3) having an inner chamber (4);
    a compressible fluid (2) inserted in the inner chamber (4);
    a compression unit (8) slidably mounted on the containment body (3) and extending, at least partly, inside the inner chamber (4) for acting on the fluid (2); said compression unit (8) being slidable from an extension position to a compression position along a respective direction of loading (C) and, from the compression position to the extension position along a respective direction of extension (E);
    a sealing gasket (11) for the fluid (2) interposed between the containment body (3) and the compression unit (8) for preventing escape of the fluid (2) from the inner chamber (4);
    at least one closed loop (13) surrounding the compression unit (8); the closed loop (13) being positioned, at least during the sliding of the compression unit (8), in contact with the sealing gasket (11) so as to limit the deformation of the sealing gasket (11); said closed loop (13) defining an anti-extrusion ring in relation to the sealing gasket (11); the containment body (3) having a positioning seat (17) in which the sealing gasket (11) and the closed loop (13) are inserted and the positioning seat (17) having a wall (20) opposite to the compression unit (8); said closed loop (13) being in contact with the compression unit (8) along an internal annular extension of the closed loop (13) for operating in interference with the compression unit (8) independently from the pressure of the fluid (2) inserted in the inner chamber (4);
    characterised in that the closed loop (13) is flexible and has a minimum diameter (DMIN) less than a maximum diameter (DMAX) of a contact portion (16) of the compression unit (8) with the closed loop (13), a gap extending, in a direction perpendicular to the direction of extension (E), from the wall (20) and towards the closed loop (13).

2. The spring according to claim 1 characterized in that the contact portion (16) of the compression unit (8) is cylinder shaped.

3. The spring according to claim 1 characterised in that the compression unit (8) is able to move along a direction of extension (E) of the spring (1) in which the compression unit (8) is, at least partly, moved away from the inner chamber (4); the closed loop (13) being interposed, at least in part, between the sealing gasket (11) and the containment body (3) according to the direction of extension (E) of the compression unit (8).

4. The spring according to claim 1 characterised in that the positioning seat (17) is shaped to substantially match the sealing gasket (11) and closed loop (13).

5. The spring according to claim 2 characterised in that the positioning seat (17) is shaped to substantially match the sealing gasket (11) and closed loop (13).

6. The spring according to claim 3 characterised in that the positioning seat (17) is shaped to substantially match the sealing gasket (11) and closed loop (13).

7. The spring according to claim 1 characterised in that the spring (1) comprises guide means (18) interposed between the compression unit (8) and the containment body (3) for guiding the sliding of the compression unit (8).

8. The spring according to claim 1 characterised in that the compression unit (8) comprises a wide portion (9) inserted inside the containment chamber (4) for forming an end of stroke position of the compression unit (8) during the sliding along the extension.

9. The spring according to claim 1 characterised in that the fluid (2) is an inert gas.

10. The spring according to claim 1 characterised in that the closed loop (13) is made of a thermoplastic polymer-based material.

11. The spring according to claim 1 characterised in that the anti-extrusion ring has a height, measured along the direction of extension (E) of the compression unit (8), less than 0.7 millimeters.

12. The spring according to claim 2 characterised in that the anti-extrusion ring has a height, measured along the direction of extension (E) of the compression unit (8), less than 0.7 millimeters.

13. The spring according to claim 1 characterised in that the closed loop (13) covers, transversely to the direction of extension (E) of the compression unit (8), only partly the sealing gasket (11).

14. The spring according to claim 1 characterised in that the closed loop (13) covers, transversely to the direction of extension (E) of the compression unit (8), entirely the sealing gasket (11).

15. The spring according to claim 1 characterised in that the closed loop (13) is made from a material harder than the material with which the sealing gasket (11) is made.

16. The spring according to claim 1 characterised in that the closed loop (13) has a width, measured transversely to the direction of extension (E) of the compression unit (8), less in respect to the distance between the wall (20) and the contact portion (16).

* * * * *